United States Patent [19]

Epperson

[11] Patent Number: 5,368,246

[45] Date of Patent: * Nov. 29, 1994

[54] OPEN-FACE SPIN CASTING FISHING REEL

[76] Inventor: Frank E. Epperson, 11397 E. Arkansas Ave., Aurora, Colo. 80012

[*] Notice: The portion of the term of this patent subsequent to Jan. 29, 2011 has been disclaimed.

[21] Appl. No.: 714,689

[22] Filed: Jun. 13, 1991

[51] Int. Cl.⁵ .......................................... A01K 89/015
[52] U.S. Cl. ...................................... 242/228; 242/242
[58] Field of Search ............... 242/227, 228, 242, 244, 242/245, 231

[56] References Cited

U.S. PATENT DOCUMENTS

| | | | |
|---|---|---|---|
| 3,085,766 | 4/1963 | Salmivuori | 242/242 X |
| 3,094,296 | 6/1963 | Nurmse | 242/242 |
| 3,697,011 | 10/1972 | Christensen et al. | 242/244 X |
| 4,166,591 | 9/1979 | Shepherd | 242/242 X |
| 4,343,442 | 8/1982 | Andersson | 242/244 |
| 4,696,437 | 9/1987 | Yoshikawa | 242/245 |
| 4,725,013 | 2/1988 | Epperson | 242/231 |
| 5,100,079 | 3/1992 | Toda | 242/245 |

Primary Examiner—Daniel P. Stodola
Assistant Examiner—Michael R. Mansen
Attorney, Agent, or Firm—John E. Reilly

[57] ABSTRACT

A spincasting reel is made up of an outer housing, a shaft extending through the housing including a line spool and nose portion at one end of the shaft externally of the housing with the fishing line extending away from the spool in the gap formed between the nose portion and housing. A line pick-up member extends across the annular gap and reciprocates with the nose portion when the fishing line is reeled in by a manual crank; and in releasing the line from the spool during the casting stroke the line pick-up member and nose portion are both latched in positions out of the path of movement of the line. As a preliminary to casting, a temporary restraint member may be advanced into engagement with the nose to prevent line release from the spool, and a drag control mechanism is associated with the shaft to apply a predetermined resistance to rotation of the spool and tension on the line when it is released from the spool.

20 Claims, 3 Drawing Sheets

OPEN-FACE SPIN CASTING FISHING REEL

Specification

This invention relates to fishing reels; and more particularly relates to a novel and improved spin casting reel of the open face type to control pick-up and release of the fishing line in a dependable and efficient manner.

BACKGROUND AND FIELD OF THE INVENTION

In my prior U.S. Pat. No. 4,725,013, I devised alternate forms of an open face spin casting reel and which were characterized in particular by a line pick-up member which can be positioned in the path of movement of the fishing line onto the spool, and the pick-up member can also be retracted out of the path of movement of the line in preparation for the casting operation. Although fishing reels of the type described have been commercialized, it is desirable to simplify the construction of the reel while lending additional versatility and compactness to the reel and to improve the line pick-up function.

SUMMARY OF THE INVENTION

Accordingly, it is an object of the present invention to provide for a novel and improved spin casting reel and particularly one of the open face type having a line pick-up member employed in association with a rotatable spool.

Another object of the present invention is to provide in a spin casting reel of the open face type for a novel and improved line pick-up and cast control mechanism wherein the reel is of simplified and compact construction.

An additional object of the present invention is to provide for a novel and improved open face spin casting reel having a level winding mechanism which obviates reciprocal movement of the spool; and further wherein a novel and improved drag control mechanism is provided to regulate the tension on the fishing line.

In accordance with the present invention, a spin casting reel is of the type having an outer housing, a shaft extending through the housing with a spool mounted on the shaft which has a fishing line wound thereon, the improvement in the present invention residing in a nose portion which includes reciprocating means to mount the nose portion for reciprocal movement across the spool, a crank member including drive means engageable with the reciprocating means for reciprocating the nose portion in response to rotation of the crank, and a line pick-up member which is disposed in radially spaced parallel relation to the axis of the spool and which is caused to follow the reciprocal movement of the nose portion. Preferably, reciprocal motion is imparted to the nose portion by an eccentric member rotated off of the crank member and which through a carrier arm reciprocates one end of the shaft supporting the nose portion, and a slide member associated with the eccentric imparts a corresponding reciprocal motion to the line pickup member so that its movement is synchronized with that of the nose portion.

Preferably, the nose portion is a cone formed with a rearwardly extending skirt which will traverse the path of movement of the fishing line onto the spool when the line is being reeled in by the crank so as to impart level winding to the line. In order to retract the line pick-up member out of the path of movement of the line during the casting operation, a cast control member includes means for retracting the line pick-up member as well as for pre-positioning the fishing line itself as a preliminary to the casting operation. Simultaneously, a latch member is caused to move into engagement with the reciprocating means to prevent reciprocal movement of the nose portion during the casting stroke.

Other objects, advantages and features of the present invention will become more readily appreciated and understood when taken together with the following detailed description of a preferred embodiment in conjunction with the accompanying drawings, in which:

DETAILED DESCRIPTION OF PREFERRED EMBODIMENT

Figure 1:
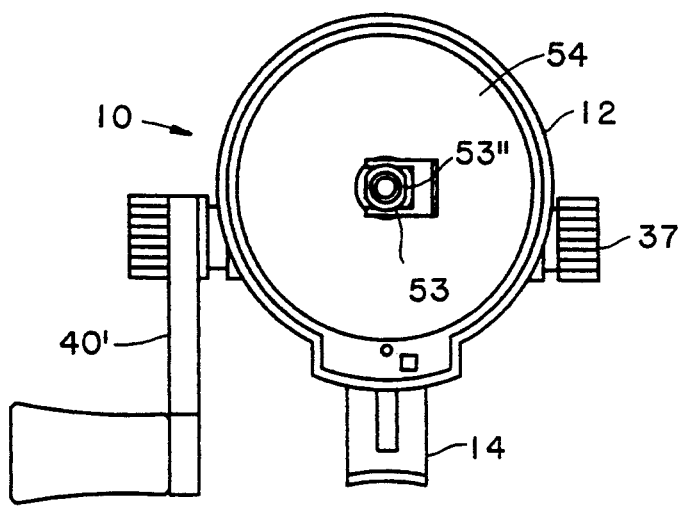
FIG. 1 is a front view in elevation of a preferred form of reel in accordance with the present invention.
Figure 2:
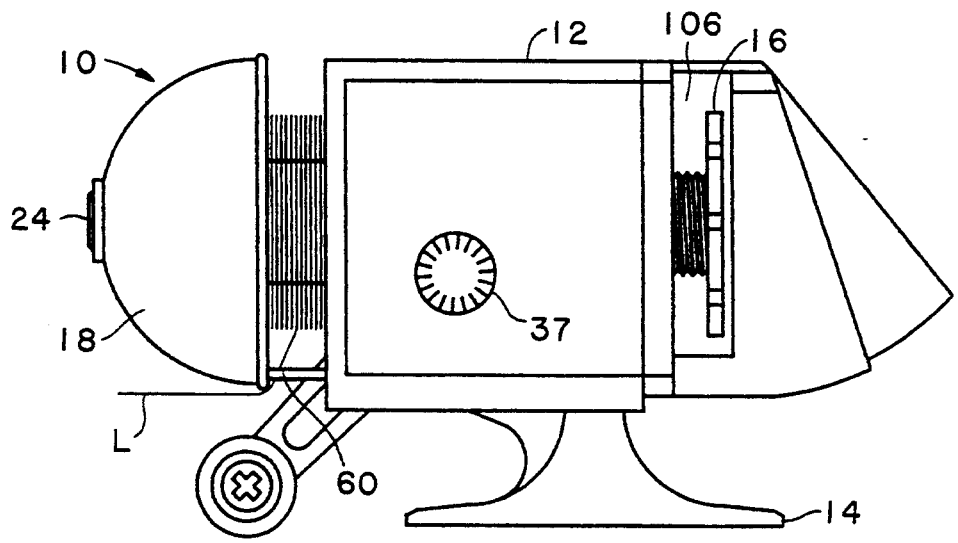
FIG. 2 is a side elevational view of the preferred form shown in FIG. 1.
Figure 3:
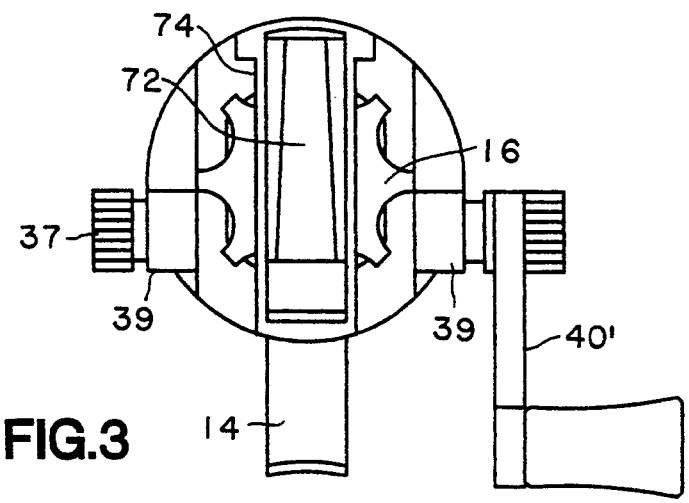
FIG. 3 is a rear view in elevation of the preferred form of invention.

Referring in detail to the drawings, FIGS. 1 to 11 illustrate a preferred form of fishing reel 10 having an outer casing 12 and a tang 14 to be releasably attached to a fishing rod in accordance with conventional practice. The preferred form of fishing reel is of the open-face type having a forward nose or cone portion 18 with a central bore 19, FIG. 10, which is releasably attached to a sleeve 20 at the end of a shaft 22 extending along the longitudinal axis of the casing 12. Although not illustrated in detail, the manner of attachment of the nose 18 to the sleeve 20 as well as its releasability from the sleeve 20 by means of a button 24 corresponds to that disclosed in my hereinbefore-referred to U.S. Pat. No. 4,725,013. A cylindrical skirt 25 extends away from the nose 18 in a rearward direction toward the casing 12 and includes a circumferential groove 26 in a rear wall of the skirt and in facing relation to the front end of the casing 12.

Figure 7:
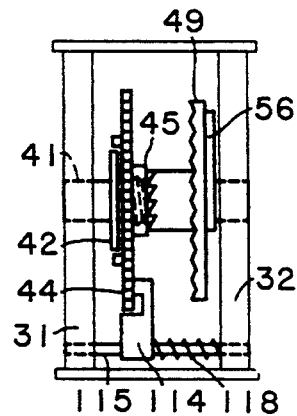
FIG. 7 is a top plan view of an internal support frame and mounting of the crankshaft and anti-reverse mechanism within the support frame.
Figure 8:
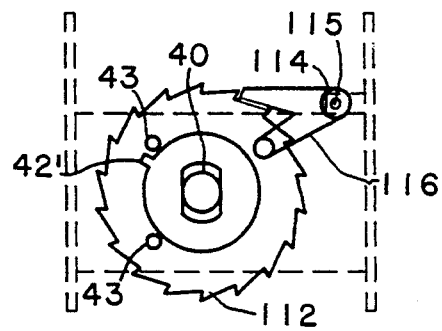
FIG. 8 is a side view of elements of the anti-reverse mechanism illustrated in FIG. 7.
Figure 9:
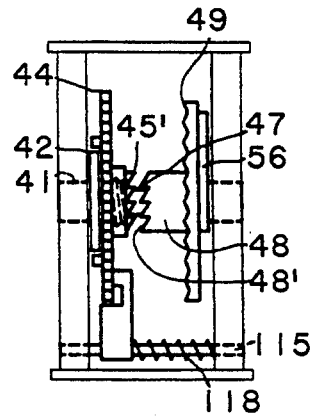
FIG. 9 is another top plan view illustrating the anti-reverse mechanism as shown in FIG. 7 but in the disengaged position.
Figure 10:
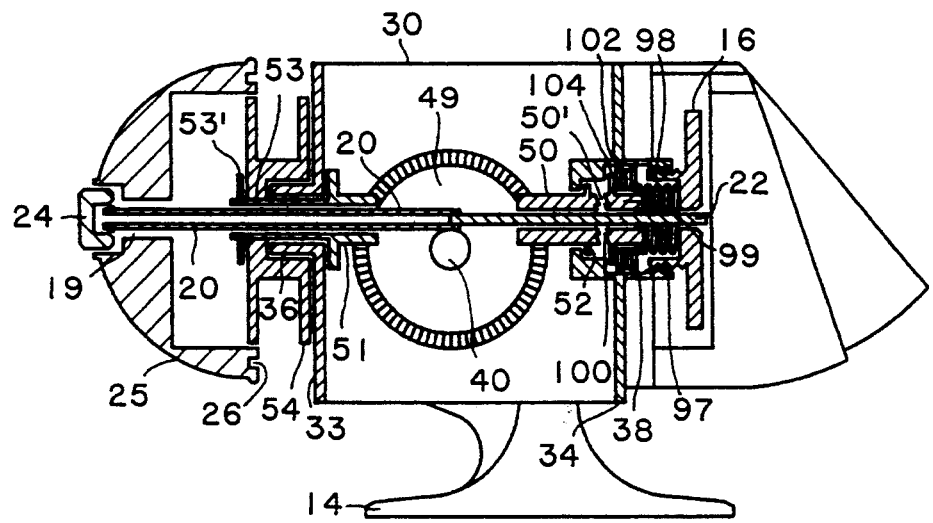
FIG. 10 is a side view partially in section and with portions broken away.

The casing 12 is of generally cylindrical configuration and disposed in outer surrounding relation to a generally rectangular support frame 30. The support frame has spaced parallel sidewalls 31 and 32, a generally circular end plate or disk 33 at its forward end and a generally rectangular end wall 34 at its rearward end joined together into a unitary frame. The front end plate 33 is provided with a forwardly extending, central hub 36, and the rear end wall 34 is similarly provided with a central hub 38 which is coaxially aligned with the hub 36 about the longitudinal axis of the casing. The sidewalls 31 and 32 have aligned counterbores for extension of a noncircular shaft 40 at one end of a crank arm 42, bearings 39 are journaled in the aligned openings in the sidewalls to receive the shaft 40, and a fastener 37 is positioned on the free end of the shaft 40 to secure it in place. As shown in FIGS. 7 to 9, the shaft 40 is keyed to a drive sleeve 41 which carries an annular drive portion 42 having a radially outwardly projecting tab 42' movable between circumferentially spaced limit stops 43 on the side surface of a ratchet gear 44. The ratchet gear 44 is carried on an annular clutch portion 45 which is threaded into one end of the drive sleeve 41 and has clutch teeth 45' at its opposite end movable into engagement with complementary clutch teeth 47 on a sleeve 48 which is journaled on the shaft 40. A circular gear 49 is keyed for rotation with the sleeve 48 so that when the drive sleeve 41 is axially advanced from the position shown in FIG. 9 to that shown in FIG. 7 the clutch teeth 45' will intermeshingly engage with the clutch teeth 48' to drive the circular gear 49. When the crankshaft 40 is rotated to reel in the line L, initially the drive sleeve 41 will cause the tab 42' on the gear 42 to rotate independently of the ratchet gear 44 as the tab 42' moves between the limit stops 43 and effectively unthreads the clutch portion 45 away from the drive gear 42 from the position shown in FIG. 9 to that shown in FIG. 7 to cause clutch teeth 45' and clutch teeth 48' to engage. As the crankshaft 40 continues to rotate, this rotation will be imparted by the tab 42' to one of the limit stops 43 thereby rotating the ratchet gear 44 as well as the clutch 45 and imparting that rotation to the drive clutch 48 and its circular gear 49. Conversely, for a purpose to be described, when the crankshaft is rotated in the reverse direction, it will cause the clutch 45 to be threaded away from the clutch 48 as the tab 42' moves back to the original limit stop position so that the gear 49 is disengaged and cannot rotate the line spool in the reverse direction.

The circular gear 49 intermeshingly engages a pair of axially spaced worm gears 50 and 51, the worm gear 50 having gear teeth 50' at one end for a purpose to be described and has circumferentially spaced tabs 52 in order to limit the movement of the worm gear 50 with respect to the end of the hub 38 on the end wall 34. The forward worm gear 51 is journaled on the sleeve portion 20 and includes a forward extension 53 which passes through the hub 36 on the front end plate 33 and has a snap ring 53' at its leading end. A line spool 54 is disposed in outer surrounding relation both to the hub 36 and to a portion of the extension 53, there being flats or non-circular portions 53" between mating surfaces of the spool 54 and extension 53 so that rotation of the worm gear 51 is imparted to the line spool 54, as shown in FIG. 1.

Figure 4:
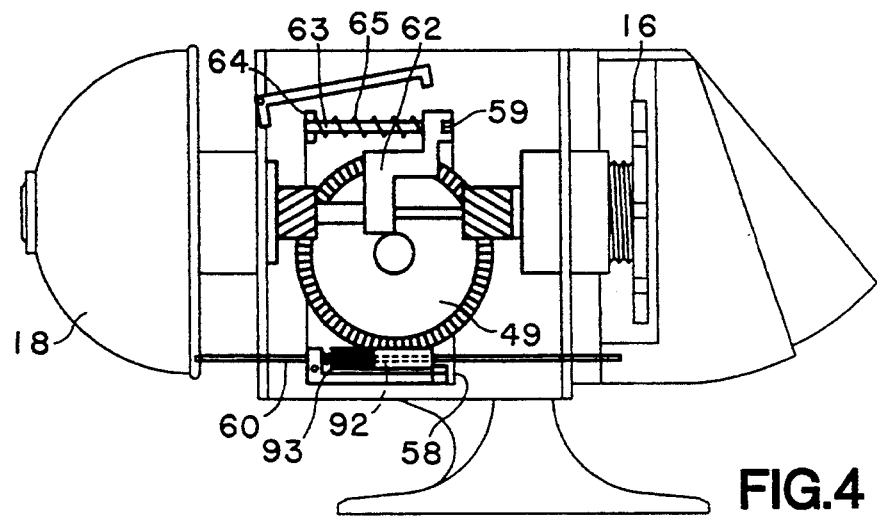
FIG. 4 is a side elevational view with portions of the casing broken away to illustrate the relationship between certain of the elements during the retrieve or reeling operation.
Figure 5:
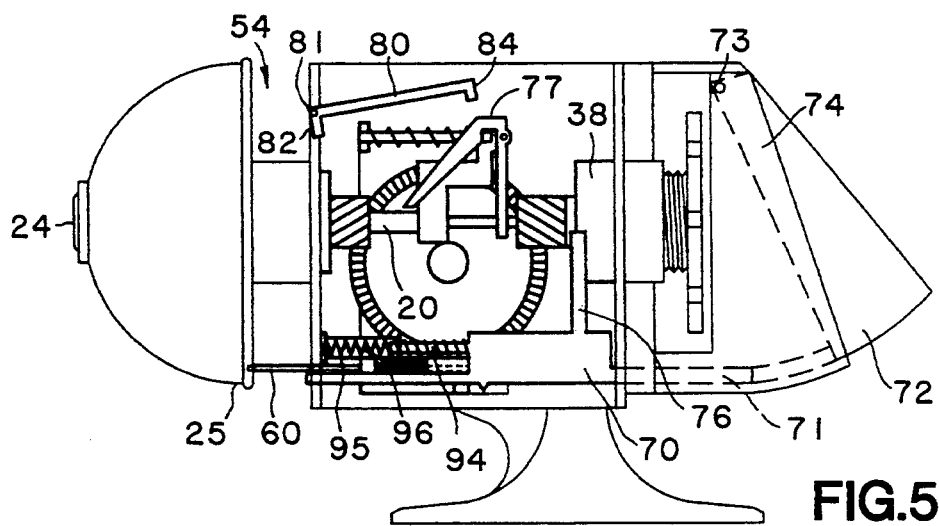
FIG. 5 is a view similar to FIG. 4 but illustrating additional parts of the line pickup and push rod assembly in the retrieved position.
Figure 6:
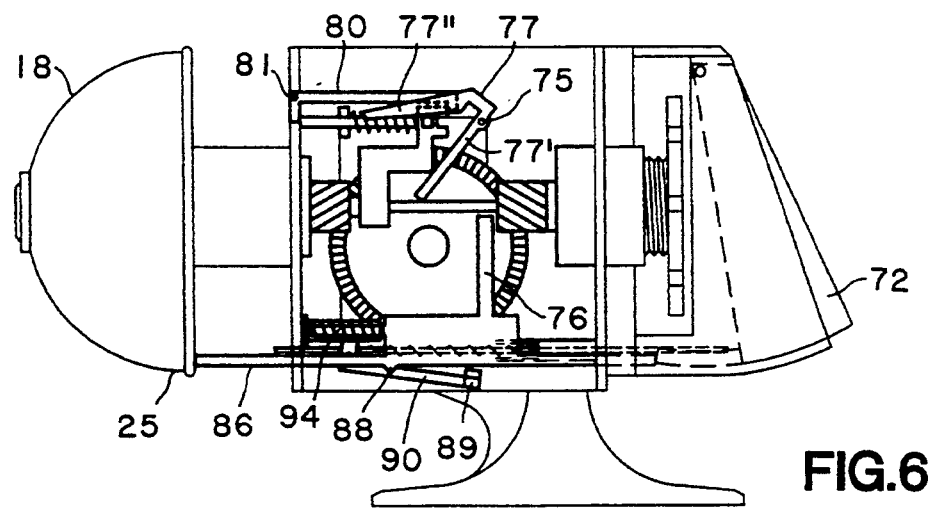
FIG. 6 is another view similar to FIG. 5 but illustrating the relative disposition and arrangement between parts during the casting operation.
Figure 11:
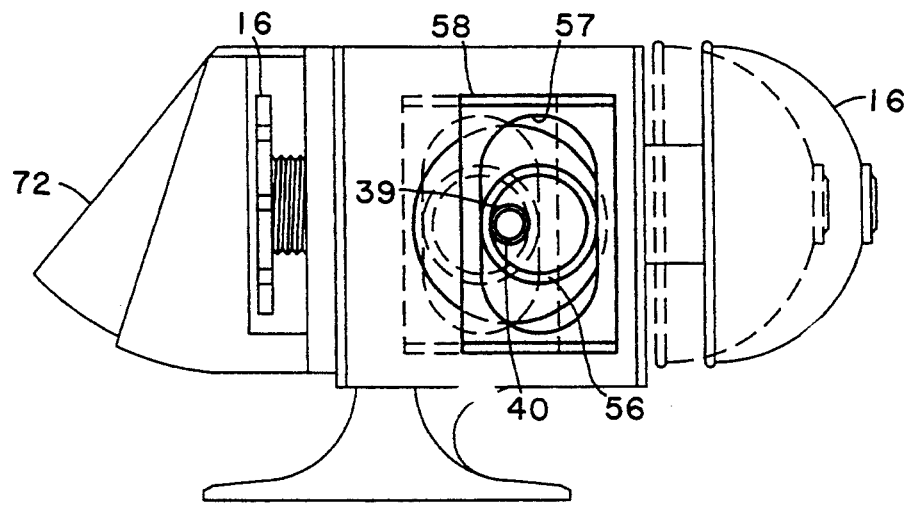
FIG. 11 is another side view in elevation and with portions broken away to illustrate the eccentric drive and slide mechanism of the present invention.

As best seen from FIGS. 7 to 9, one side of the drive gear 49 is provided with a shoulder 56 which is eccentrically mounted with respect to the crankshaft 40 and which rides along a generally oval-shaped track 57 within a rectangular slide frame 58 whereby rotation of the crankshaft will impart reciprocal motion to the slide 58 between the dotted and full line positions as shown in FIG. 11. A line pick-up rod 60, as shown in FIGS. 4 to 6, is carried at the lower end of the slide frame 58 and advances across the outer peripheral edge of the line spool 54, or just outwardly thereof, with its leading end engageable with the circumferential groove 26 in the nose portion 18. Thus, as the line spool 54 is rotated by the crankshaft, the nose 18 and line pick-up rod 60 will be reciprocated back and forth in an axial direction, and the skirt 25 will traverse the outer peripheral gap or space between opposite flanges of the line spool so as to promote level winding of the line L onto the spool. A carrier arm 62 extends downwardly from an upper end of the slide 58 and is attached to the rearward end of the sleeve 20 thereby imparting reciprocal movement to the sleeve 20 and attached nose 18 in causing it to traverse the line spool 54. The line pick-up rod 60 also follows the reciprocal movement of the slide 58 as described and is synchronized with the movement of the nose 18 so that it will remain against the rear end wall of the skirt 25 and cause the line to be wound upon the spool as it is rotated. The upper end of the arm 62 includes a release rod 63 which extends forwardly in a direction parallel to the axis of the casing through an opening 64 in the leading end of the slide 58; and a return spring 65 is disposed on the release bar 63 to yieldingly resist forward movement of the carrier 62 independently of the slide 58. The carrier 62 is affixed to the sleeve 20 and its upper end is in the path of movement of a transverse arm 59 on the slide 58 so that the carrier will follow the forward reciprocal movement of the slide 58 as the crank 42 is rotated, and the spring 65 will then cause the carrier to return in a rearward direction with the slide as it is reciprocated by the rotation of the crankshaft.

A push rod 70 is slidably positioned beneath the reciprocal slide 58 and includes a rearward extension 71 in the path of travel of the cast control member 72. The cast control member 72 is pivotal about an upper pivot 73 for advancement through the rearward open end of the housing 74, the latter forming a rearward extension of the casing 12. The push rod 70 includes an upwardly directed arm 76 which when the member 72 is depressed will move forwardly into engagement with a lower leg 77' of a rocker 77 which is pivoted as at 75 to the upper rear corner of the slide 58. As shown in FIG. 5, a second inclined rocker arm 77" is normally latched to the carrier arm 62 to prevent forward movement of the nose portion 18 when there is tension on the line L. When the rocker 77 is pivoted to the position shown in FIG. 6, the upper rocker arm 77" will pivot out of latching engagement with the carrier 62.

A latch member 80 is pivoted as at 81 and includes a first portion 82 which is engaged by the leading end of the release arm 63, and a catch or second portion 84 at its opposite free end moves downwardly into engagement with the upper rearward end of the carrier 62 when the slide 58 is shifted forwardly by the nose portion 18 at the beginning of the casting operation as hereinafter described.

The push rod 70 includes a forwardly extending leg 86 which when the cast control member 72 is depressed will advance forwardly into engagement with the rear end wall of the skirt 25 thereby forcing the nose 18 in a forward direction at the beginning of the casting operation and moving the slide 58 against the latch end portion 82 to force the catch 84 against the rear corner of the slide 58. As the push rod 70 is moved in a forward direction, a projection 88 on its undersurface will engage a free end portion 89 of latch 90 to release the pick-up rod 60. The latch 90 normally bears against a retainer sleeve 92 for a return spring 93 which is disposed in surrounding relation to the line pick-up rod 60. The latch 90 is pivoted at its forward end to the slide 58 and when latched against the rear end of the sleeve 92 will cause the pin 60 to reciprocate with the eccentric slide; however, when the push rod 70 and its projection 88 releases the latch 89, the pick-up rod 60 will then be retracted rearwardly along with the sleeve 92 out of the path of the line L. It is to be noted also that the push rod 70 includes a pin 94 that extends forwardly into a spring guide cylinder 95, and a return spring 96 is mounted under compression on the pin 94 to bias the push rod in a rearward direction. Accordingly, when the push rod 70 is advanced in a forward direction by the cast control button 72, it must overcome the rearward urging of the return spring 96; and when the cast control member 72 is released, the spring 96 will retract the push rod 70 out of the path of the line L as a preliminary to casting or release of the line L.

In order to control the resistance to rotation of the spool 54 during the casting operation, a drag control dial 16 is disposed at the rearward end of the shaft 22 and has a hollow cylindrical extension 97 which is externally threaded to engage complementary internal threading at the rearward end of the hub 38. A coiled spring member 98 is disposed in outer spaced surrounding relation to the shaft 22 within the cylindrical portion 97 and bears against a drag control sleeve 99 which is provided with gear teeth 100 in facing relation to the gear teeth 48 on the follower 45. A series of washers 102 are stacked between the leading edge of the cylindrical portion 97 and a flange 104 on the external surface of the sleeve 99. In this way, inward threaded adjustment of the dial 16 will cause the washers 102 to move forwardly against the flange 104, and the spring 98 will increase the pressure on the drag control sleeve 99 to urge the gear teeth 100 into engagement with the complementary gear teeth 50' so that the sleeve 99 will follow the rotation of the gear 50. The amount of resistance or drag imparted to rotation of the gear 50 is controlled by the inward threading of the dial 16 against the washers 102. One of the intermediate of the washers 102 is keyed to the sleeve 99 while opposite end washers are keyed to the stationary hub 38, and still another intermediate of the washers 102 may be a relatively high friction fabric washer. In this way, when the dial 16 is threaded inwardly, it will exert increased pressure on the washers 102 to progressively increase the resistance to rotation of the worm gear 50 and which is imparted through the gear 49 and forward worm gear 51 for increased resistance to rotation of the spool 54 and thus the amount of tension on the line L.

The drag control dial 16 has a thumb wheel as shown which is accessible through a cavity 106 in the rear housing so that the dial can be manually rotated to impart the desired degree of tension to the line prior to the casting operation. In casting, the cast control lever 72 is depressed to advance the push rod 70 forwardly into engagement with the nose portion 18 as the line pick-up rod 60 is retracted by releasing the latch 90. Forward advancement of the nose 18 will cause the carrier arm 62 to be latched in the forward position by the catch 84 so that the nose 18 is fixed in a position out of the path of the line L during the casting operation. The cast control member 72 is released in preparation for the casting stroke whereupon the push rod 70 is retracted away from the path of the spool 54 under the rearward urging of the spring member 96, and the line L will then feed freely off of the spool when the reel is cast in a forward direction. At the completion of the casting stroke, the line L is set by rotation of the crank 40 until the forward edge of the reciprocal slide member 58 moves against the underside of the latch 80 causing the latch 80 to move upwardly away from engagement with the carrier arm 62. At the same time, the forward advancement of the reciprocal slide member 58 will cause the line pick-up rod 60 to advance forwardly across the path of travel of the line L thereby preventing release of the line from the spool.

FIG. 6 illustrates the relative disposition and arrangement between the elements when the cast control member 72 is depressed and the push rod 70 advanced in preparation for casting. FIGS. 4 and 5 illustrate the reel in the retrieved position after the crank has been rotated to release the latch 80 and the line pick up rod 60 advanced across the path of the line L; and in FIG. 4 the push rod has been omitted to better illustrate the mounting and disposition of the pick-up rod 60 as well as its sleeve 92 and engagement of the sleeve 92 with the latch 93.

FIGS. 7, 8 and 9 are views partially in section of the anti-reverse mechanism which is mounted on the crankshaft 40 to limit rotation of the crank 42 in a direction to wind the line L onto the spool. The anti-reverse mechanism basically corresponds to that disclosed in my prior U.S. Pat. No. 4,725,013 and comprises the gear 44 having ratchet teeth 112 on its outer surface. A dog 114 is pivoted on pivot shaft 115 to the rear end wall 34 of the frame and is provided with a downwardly extending arm 116, the free end of which bears against the side of the gear 44. The pivot shaft 115 includes a spring element 118 to increase the pressure of the leg 116 against the side of the gear 44 so that if the crank 42 should be rotated in a clockwise direction, as viewed in FIG. 8, the pressure exerted by the arm 116 on the side of the gear 110 will cause the upper dog element 114 to move downwardly into the path of travel of the teeth 112. As a result, the anti-reverse mechanism will permit the crank to be rotated in a reverse direction only for a limited distance causing the drive tab 42' to rotate back against the upper limit stop so as to thread the ratchet gear 44 away from the clutch 48 so as to disengage the gear 49. For example, the crank would be disengaged at the end of the reeling operation in preparation for the next cast so that the crank 42 will not rotate when the line L is released off of the spool 54. Furthermore, the crank is so constructed and arranged that it may be assembled or installed in the casing either for left-hand or right-hand operation.

From the foregoing, it will be apparent that a novel and improved fishing reel has been devised which is characterized by being extremely compact, lightweight with a minimum number of parts and which avoids the use of a bale. The spool can be quickly and easily changed, and the reciprocating nose or cone 18 achieves a highly dependable and efficient level wind mechanism which avoids reciprocation of the spool while permitting continuous drag control on the line. The line pick-up member 60 is automatically set by the crank at the beginning of the retrieve or reeling operation and in such a way as to be synchronized with the reciprocal motion of the nose 18.

It is therefore to be understood that while a preferred embodiment of the present invention is herein set forth and described, various modifications and changes may be made without departing from the spirit and scope of the present invention as defined by the appended claims and reasonable equivalents thereof.

I claim:

1. In a spinning reel having an outer housing, a shaft extending through and beyond one end of said housing, a spool mounted on said shaft having a fishing line wound upon said spool for extension along a radial path of movement between s aid spool and said housing, and a drag control member to control the resistance to rotation of the spool, the improvement comprising:
   a nose portion disposed on said shaft externally of said housing and in axially spaced relation to said one end of said housing, reciprocating means mounting said nose portion for reciprocal movement toward and away from said spook and said one end of said housing, said nose portion including guide means for guiding said line in an outward radial direction between said one end of said housing and said nose portion and in an axial direction over an external surface of said nose portion;
   a crank including drive means engageable with said reciprocating means for reciprocating said nose portion in response to rotation of said crank; and
   an axially extending line pick-up member disposed for axially directed movement in radially spaced parallel relation to said spool between said one end of said housing and said nose portion, and slide means for imparting reciprocal, axially directed movement to said line pick-up member which follows the reciprocal movement of said nose portion in guiding said line over said external surface and onto said spool.

2. In a spinning reel according o claim 1, said nose portion mounted on said shaft and said guide means defined by a rearwardly extending skirt in facing relation to said spool and said one end of said housing.

3. In a spinning reel according to claim 2, said rearwardly extending skirt having a circumferential groove therein, and said line pick-up member movable into engagement with said circumferential groove.

4. In a spinning real according to claim 2, including latch means for deactivating said slide means whereby said nose portion is held out of the path of movement of said fishing line when said fishing line is to be cast.

5. In a spinning reel according to claim 1, a cast control member including means for retracting said line pick-up member out of the path of movement of said line prior to casting said line.

6. In a spinning reel according to claim 5, including line control means movable in response to actuation of said cast control member into the path of movement of said fishing line when said line pick-up member is retracted out of the path of movement of said fishing line.

7. In a spinning reel according to claim 6, including slide-engaging means movable into engagement with said slide means to fix said nose portion against reciprocal movement when said 5 line control means is advanced into the path of movement of said fishing line.

8. In a spinning reel according to claim 6, said line control means being movable into engagement with said nose portion.

9. In a spinning reel according to claim 1, said drive means imparting rotational movement to said spool in cooperation with the reciprocation of said nose portion.

10. In a spinning reel according to claim 9, said nose portion including a rearwardly extending skirt reciprocal across the path of movement of said fishing line onto said spool when said spool is rotated by said drive means.

11. In a spinning reel having an outer housing, a shaft extending through and beyond one end of said housing, a spool mounted on said shaft at said one end of said housing having a fishing line wound upon said spool for extension between said spool and said housing along a radial path of movement to and from said spool the improvement comprising:
   a cone portion disposed on said shaft externally of said housing, reciprocating means for reciprocal movement of said cone portion toward and away from said spool and said one end of said housing, said cone portion including guide means for guiding said line in a radial outward direction between said one end of said housing and said nose portion and in an axial direction over an external surface of said nose portion;
   a crank including drive means engageable with said reciprocating means for reciprocating said cone portion in response to rotation of said crank; and
   an axially extending line pick-up member disposed in radially spaced parallel relation to said spool, and slide means for imparting reciprocal movement to said line pick-up member in a direction parallel to said shaft, the reciprocal movement of said line pick-up member being synchronized with the reciprocal movement of said cone portion in causing said line to be wound upon said spool.

12. In a spinning reel according to claim 11, said cone portion mounted on said shaft and having a rearwardly extending skirt in facing relation to said spool, said rearwardly extending skirt having a circumferential groove therein, and said line pick-up member movable into engagement with said circumferential groove.

13. In a spinning reel according to claim 11, a cast control member including means for retracting said line pick-up member out of the path of movement of said fishing line, and latch means for deactivating said slide means whereby said cone portion is held out of the path of movement of said fishing line when said fishing line is cast from said spool.

14. In a spinning reel according to claim 11, including line control means movable in response to actuation of said cast control member into the path of movement of said fishing line when said line pick-up member is retracted out of the path of movement of said line, said line control member movable into engagement with said cone portion across the path of said fishing line.

15. In a spinning reel according to claim 14, including latch means movable into engagement with said slide means to fix said cone portion against reciprocal movement when said line control member is advanced into engagement with said cone portion.

16. In a spinning reel according to claim 11, said drive means imparting rotational movement to said spool in cooperation with the reciprocation of said cone portion.

17. In a spinning reel according to claim 11, said cone portion including a rearwardly extending skirt reciprocal across the path of movement of said fishing line onto said spool when said spool is rotated by said drive means.

18. In a spinning reel according to claim 11, said drive means including a bevel gear, worm gears at axially spaced locations on said shaft for rotation by said bevel gear.

19. In a spinning reel according to claim 18, said drive means including clutch means for drivingly connecting said crank member to said bevel gear when said crank member is rotated in a direction to reel in said fishing line.

20. In a spinning reel according to claim 18, including drag control means associated with one of said worm gears to regulate the tension on said fishing line.

* * * * *